United States Patent [19]

Sawyer

[11] Patent Number: 4,961,370

[45] Date of Patent: Oct. 9, 1990

[54] LOAD PUSHING APPARATUS

[75] Inventor: Dennis C. Sawyer, Windlesham, United Kingdom

[73] Assignee: Mantech Limited, Camberley, England

[21] Appl. No.: 173,101

[22] Filed: Mar. 28, 1988

[30] Foreign Application Priority Data

Mar. 30, 1987 [GB] United Kingdom ............... 8707517

[51] Int. Cl.⁵ ............................................. F41A 9/39
[52] U.S. Cl. ...................................... 89/47; 89/33.05; 52/108
[58] Field of Search .................... 89/33.05, 47; 226/88; 242/54 A; 52/108, 734

[56] References Cited

U.S. PATENT DOCUMENTS

| 2,157,278 | 5/1939  | Blackmore      | 242/54 A |
| 3,224,705 | 12/1965 | Nash           | 226/88   |
| 3,273,813 | 9/1966  | George         | 242/54 A |
| 3,355,148 | 11/1967 | Botello et al. | 242/54 A |
| 3,371,801 | 3/1968  | Widegren       | 52/108   |
| 3,467,328 | 9/1969  | Berry et al.   | 52/108   |
| 3,474,976 | 10/1969 | Rushing et al. | 52/108   |
| 3,499,610 | 3/1970  | Leonard        | 52/108   |
| 3,589,632 | 6/1971  | Rew            | 242/54 A |
| 3,862,528 | 1/1975  | Meissinger     | 242/54 A |
| 3,905,453 | 9/1975  | Frank          | 52/108   |
| 4,047,339 | 9/1977  | Smith et al.   | 242/54 A |

FOREIGN PATENT DOCUMENTS

| 47649  | 12/1910 | Austria ..................... | 52/108 |
| 52708  | 3/1912  | Fed. Rep. of Germany .......... | 89/47  |
| 223087 | 8/1942  | Switzerland ............................ | 89/47 |
| 737014 | 9/1955  | United Kingdom .................. | 52/108 |

OTHER PUBLICATIONS

Rimrott, Storable Tubular Extendible Members, (Engineering Digest), 7/68, pp. 28-33.

Primary Examiner—Charles T. Jordan
Assistant Examiner—Stephen Johnson
Attorney, Agent, or Firm—Bacon & Thomas

[57] ABSTRACT

Apparatus for pushing a load e.g. a projectile comprises an elongate ribbon which can be extended from a condition where it is coiled on a drum to a substantially straight condition for pushing the load. The ribbon has a generally curved cross section when in its straight condition, and at its front end it has a buffer arranged such that when engaged with the load, the compressive force on the ribbon acts eccentrically so as to deflect the ribbon laterally in a direction towards the center of curvature of the cross section and to bias the ribbon against deflection in the opposite direction.

11 Claims, 7 Drawing Sheets

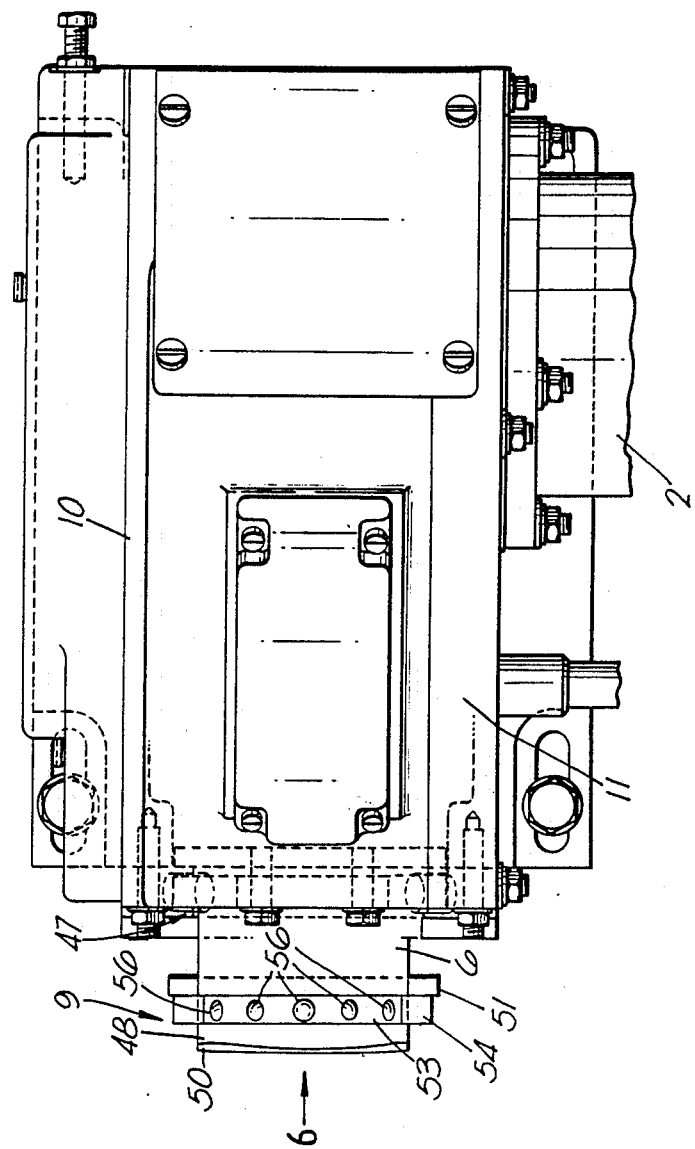
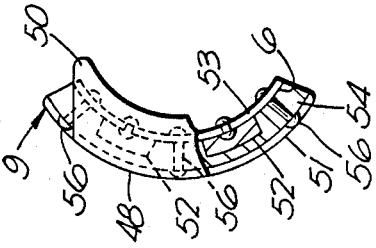

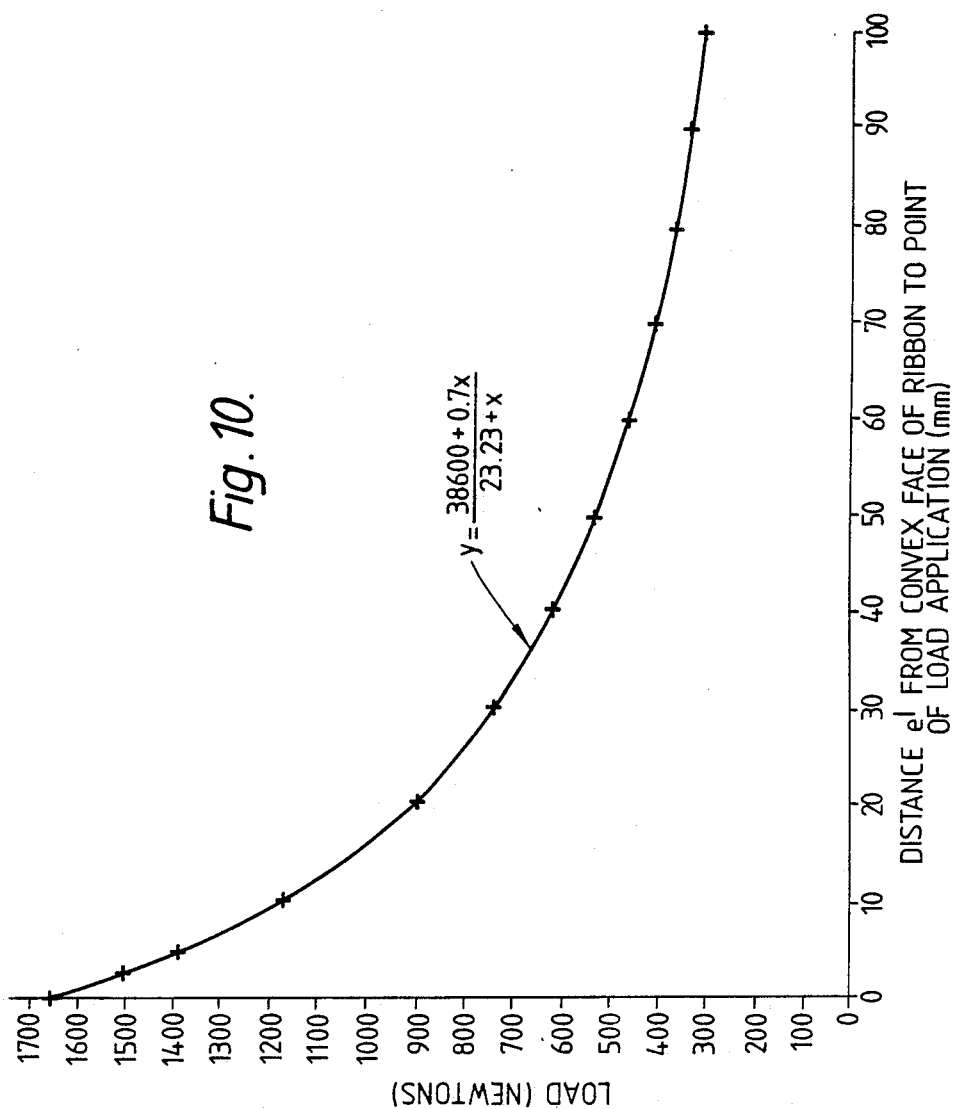

LOAD PUSHING APPARATUS

This specification relates to apparatus for pushing a load from one location to another, e.g. for transferring a projectile such as a shell from a magazine to a gun chamber.

It is known to provide a rammer system capable of ramming a projectile from a magazine to a gun chamber, in which the projectile is engaged and pushed by means of an elongate thin-walled ribbon of steel which is driven from off a drum. While the projectile is being pushed the ribbon is subject to a longitudinal compressive load and thus acts as a strut. To provide it with the necessary flexural rigidity it has a curved cross-sectional shape, and at the same time such a shape enables the ribbon to be retracted by being wound onto the drum, at which time the curved shape is flattened, similar to the retraction of a steel tape measure.

When the curved ribbon is under longitudinal compression with its two ends restrained from lateral movement, there may be a tendency towards lateral deflection of the ribbon. This deflection can take place in one of two possible directions i.e., generally towards or away from the centre of curvature. For the avoidance or doubt, in this specification the directions are expressed in terms of deflection of the middle region of the ribbon relative to its ends. In practice, relatively small lateral deflections in the direction away from the centre of curvature can result in collapse and the ribbon ceases to act as a strut. This is one of the factors which governs the maximum compressive forces to which the ribbon can be subjected in practice. Increasing the thickness of the ribbon may increase the compressive load which can be borne safely, but this adds to cost, size and so forth. There is thus a need for an arrangement which will increase the compressive loads to which any given ribbon can be subjected.

There is thus disclosed herein apparatus for pushing a load, comprising an elongate ribbon which can be extended from a coiled condition to a substantially straight condition for pushing the load, the ribbon having a generally curved cross section when in its straight condition, wherein the arrangement is such that when engaged with the load, the compressive force on the ribbon acts eccentrically so as to deflect the ribbon laterally in a direction towards the centre of curvature of the cross section and to bias the ribbon against deflection in the opposite direction.

It is found that the ribbon can withstand considerably higher compressive forces, before collapse, when deflected towards the centre of curvature that when deflected away from it. Thus, by providing a degree of bias higher forces can be imposed before there is a risk of collapse.

The apparatus can be used in any situation where it is desired to push a load from one location to another, for example for moving workpieces in an automated production line, or for moving projectiles such as shells from a magazine to a gun chamber. In these applications, the load will generally be supported and guided while being pushed. Whilst designed primarily for pushing the apparatus can be used for pulling on its return stroke. Additionally, the ribbon may be used as a retractable strut, mast etc, either alone or multiplied in back to back, triangular or rectangular fashion etc.

Preferably, at one end of the ribbon there is provided means for engaging the load so constructed and arranged to offset the compressive force with respect to the longitudinal centroidal axis of the ribbon, in the direction away from the centre of curvature. For a given value of compressive force, an increase in the amount of offset produces an increase in the amount of lateral deflection obtained. Thus it will be appreciated that the amount of offset is preferably chosen to be the minimum which can ensure lateral deflection in the desired direction. The amount of offset can be greater than this minimum value provided it does not result in excessive lateral deflections or the risk of collapse of the ribbon. By way of example only, with a preferred ribbon extending to a maximum length in the straight condition of say 2 to 2.5 m, it has been found that an offset of 3.5. mm is suitable, the offset being measured in terms of the distance from the convex face of the ribbon in a direction away from the centre of curvature.

Preferably the means for engaging the load comprises an engagement pad shaped such that its point of initial contact with the load is offset. The front face of the pad may be angled such that under the compressive force the pad can pivot generally about the point of initial contact so as to bias the ribbon for deflection in the direction towards its centre of curvature. Thus, the pad may be wedge-shaped for example. The pad may be formed of a compressible material, such as rubber or the like, so that the shock of initial contact between the load and the pad can to some extent be absorbed, the pad acting as a buffer. During pushing of the load, the material will compress and the compressive force will be applied over the compressed region, and although the point of net force application may change marginally with increasing material compression, the angled face of the pad will ensure that the net force remains offset.

The front face of the engagement pad may be of any convenient shape, eg. circular, to suit a particular application, but preferably has a curved shape generally corresponding to the curved cross-sectional shape of the ribbon, so that the compressive force can be applied across the breadth of the ribbon. In order to connect the pad securely to the ribbon, the pad may have an integral web which extends rearwardly to be gripped between a pair of plates secured to the end of the ribbon.

Generally the elongate ribbon will be thin-walled i.e., having a thickness which is small in relation to the overall dimensions of its cross-sectional shape, and the thickness of the section may be variable. References herein to the cross-sectional shape being generally curved are intended to embrace a variety of shapes in which the majority of the section is disposed to one side of a straight line joining the two edges of the section e.g., C-shaped, U-shaped, L-shaped, V-shaped or W-shaped. Preferably however, the ribbon section is part-circular and subtends an angle of 180° or less at the circle centre. The ribbon may be formed of an elastic material such as spring steel, or carbon or fibre reinforced plastic, so as to have the necessary flexural rigidity for pushing the load, while at the same time it can be elastically bent into the coiled condition, such as by winding it on to a drum.

Thus, in a preferred embodiment, the elongate ribbon is wound onto a drum in the coiled condition, and driving means are provided to unwind the ribbon from the drum during pushing of the load. Such driving means may be powered manually or by an electric or hydraulic motor or the like and may take various forms, such as for example, one or more driving sprockets which engage in sprocket holes in the ribbon. Alternatively, the driving means may comprise e.g. a driving capstan urged into engagement with a surface of the ribbon by a pressure roller disposed there beneath, to pull it from the drum, although means for directly driving the drum might be provided additionally or even alternatively. In any event, direct drive of the drum is desirable for rewinding the ribbon onto the drum.

A preferred construction exemplifying some of the above and other broad aspects, by way of example only, will now be described with reference to the accompanying drawings, in which:

FIG. 5 is a plan view of the assembly viewed in the direction of arrow 5 in FIG. 2;

FIG. 6 is a view of the mounting arrangement for a buffer on the end of the ribbon, viewed in the direction of arrow 6 in FIG. 5 and shown partly in section;

FIG. 8 is a diagrammatic illustration of a portion of the ribbon under a longitudinal compressive force;

FIG. 10 is a graph showing how the magnitude of eccentric load giving a specified lateral deflection varies with the amount of eccentricity of the force.

Figure 1:
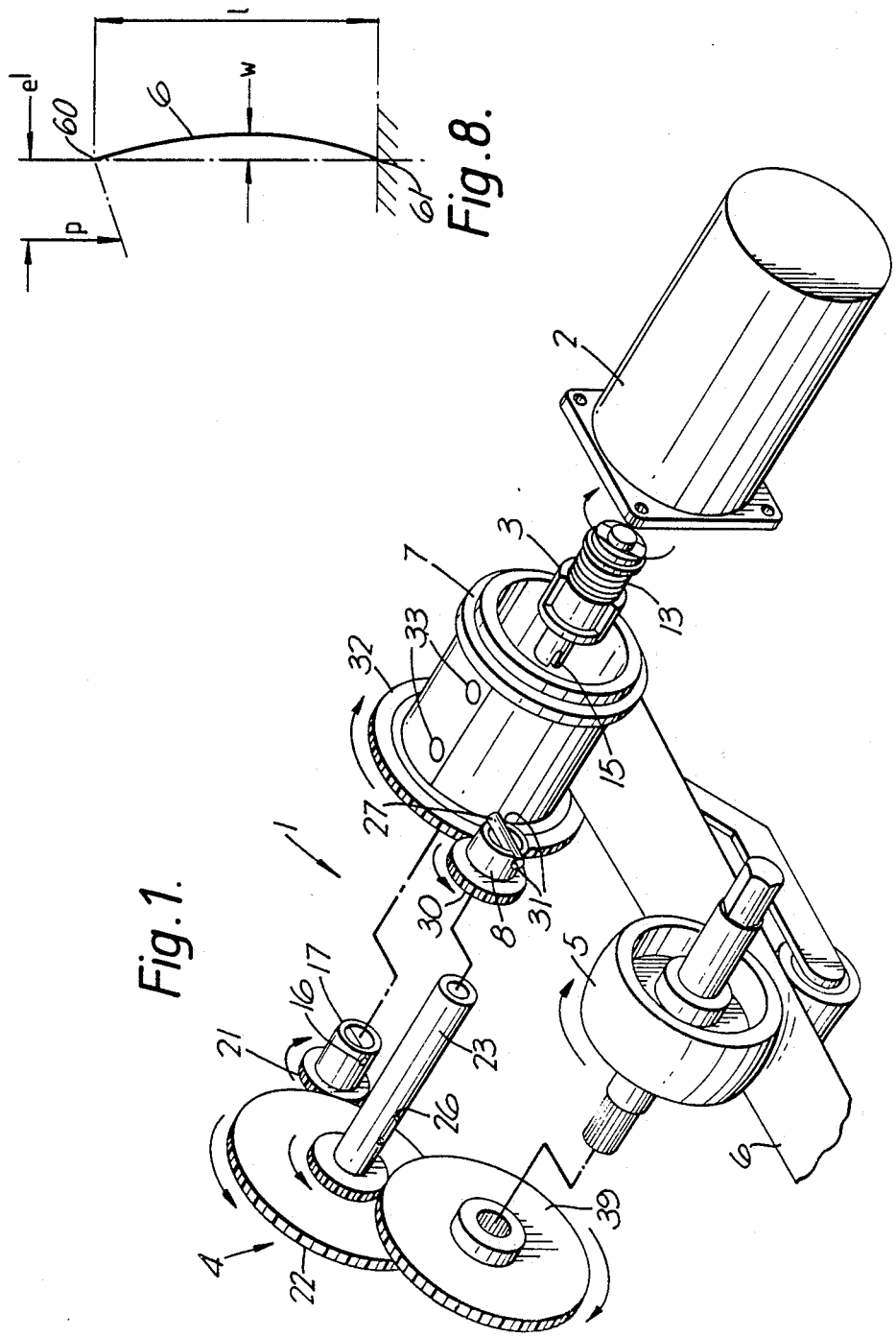
FIG. 1 is an exploded perspective view of a ribbon rammer assembly.

Referring to FIG. 1, this shows the basic components of the ribbon rammer assembly 1, comprising an electric motor 2 connected via a friction clutch 3 to a reduction gear assembly 4 which is connected to a capstan 5 for driving the ribbon 6 from off a storage drum 7. The reduction gear assembly 4 is also connected to drive the storage drum 7 via a ratchet clutch 8. On the end of the ribbon a buffer 9 is mounted for pushing a load (not shown) which is supported and guided to be transferable from one location to another. If the assembly forms part of an auto-loader system of a gun, then the mass will be a projectile such as a shell or rocket.

Figure 3:
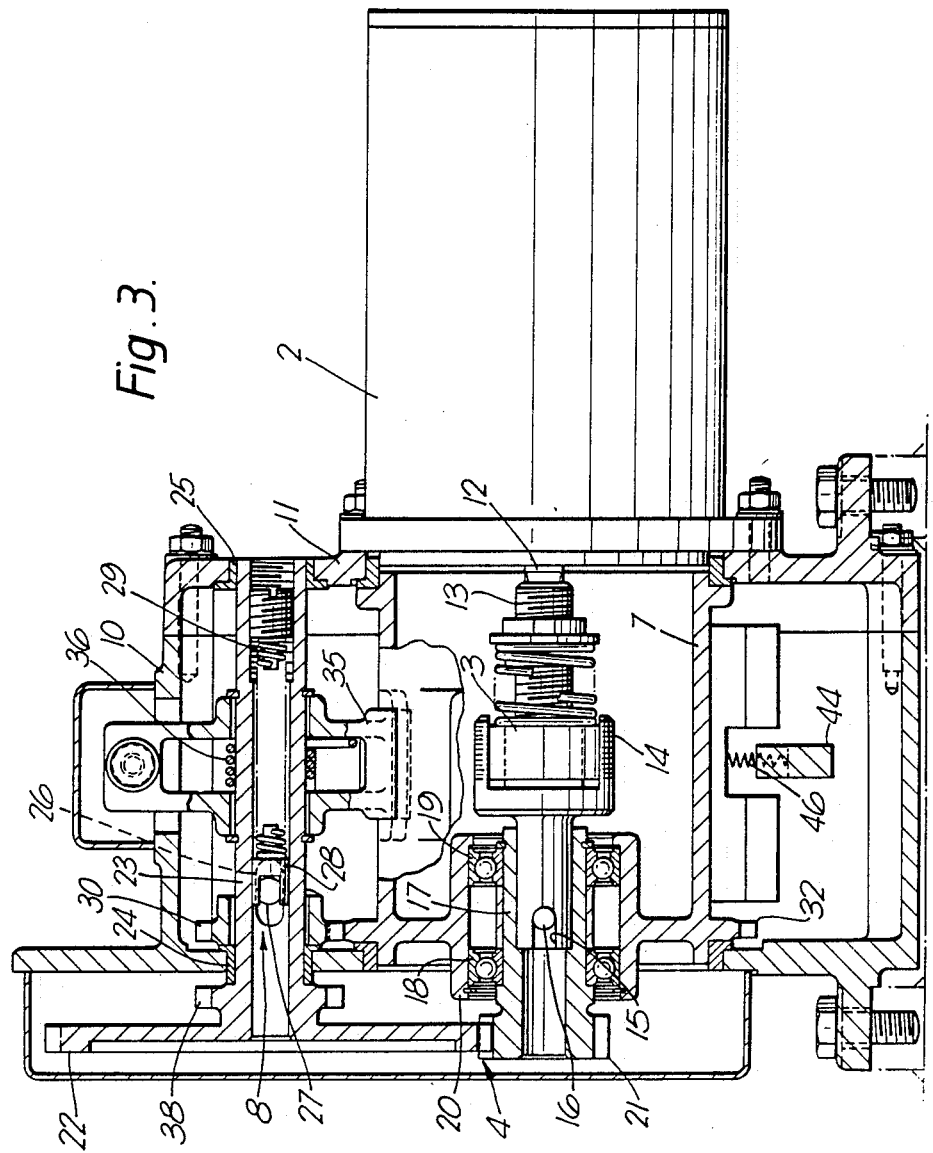
FIG. 3 is a section on the lines 3—3 of FIG. 2.
Figure 4:
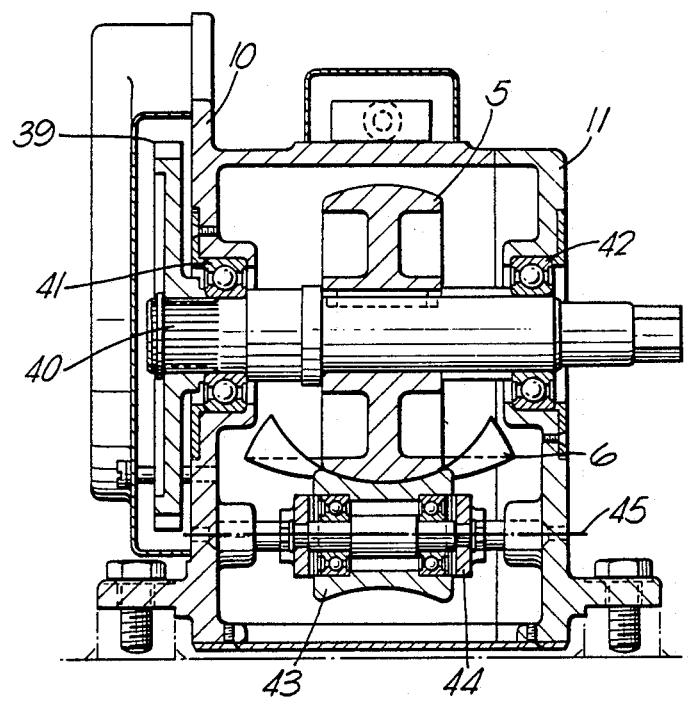
FIG. 4 is a section on the lines 4—4 of FIG. 2.

The various components of the assembly are shown in greater detail in FIGS. 3 to 6. Referring to FIG. 3, a main housing 10 covers the top, bottom and one side of the assembly and the side casing 11 is bolted at the other side thereof to the main housing. The electric motor 2 is bolted to the side casing and has an output shaft 12 extending through an opening in the side casing 11 and connected to an input 13 of the clutch 3. The clutch is of the multiplate type and is spring-biased to transmit drive to its output member 14 which has a slot 15 formed in one end thereof. The slot engages a cross-pin 16 extending across an axial cavity of a hollow shaft 17 to provide a driving connection. The shaft 17 is rotatably supported by a pair of spaced apart bearings 18, 19 mounted on an inner cylindrical flange 20 of the storage drum 7. On the end of the shaft 17 is integrally formed a gear wheel 21, the first gear wheel in the reduction gear assembly 4. It is to be noted that the motor output 12, the clutch 3 and the hollow shaft 17 are all coaxially arranged with the storage drum and are conveniently disposed in the axial cavity thereof.

The reduction gear assembly includes a large gear wheel 22 arranged in meshing engagement with gear wheel 21 and disposed upwardly and forwardly thereof. The gear wheel 22 is formed integrally on one end of a hollow shaft 23 which extends across the rammer assembly and which is rotatably mounted by bush bearings 24, 25 respectively supported by the main housing 10 and the side casing 11. As can be seen in FIGS. 1 and 3, the ratchet clutch 8 includes a pair of longitudinal slots 26 formed in diammetrically opposed faces of the hollow shaft 23 and a cross-pin 27 extending between the slots and projecting radially outwardly of the shaft.

The cross-pin 27 is longitudinally movable of the shaft 23 and is urged to the left as viewed in FIG. 3 by a plunger 28. The plunger engages the cross-pin at its mid-point and is leftwardly biased by a compression spring 29. A ratchet clutch gear wheel 30 has a slanted end face formed with two diametrically opposed ratchet teeth 31, the cross-pin being urged into engagement with the end face. When the hollow shaft 23 together with its cross-pin 27 rotate anti-clockwise relative to the gear wheel 30, as viewed in FIG. 1, the cross-pin slides accross the end face of the gear wheel and there is no driving engagement i.e., the ratchet clutch slips. However, when there is a tendency for the hollow shaft 23 to rotate clockwise relative to the gear wheel 30, then the cross-pin 27 engages the two ratchet teeth 31 so that the shaft 23 drives the gear wheel i.e., the ratchet clutch is engaged.

The ratchet clutch gear wheel 30 is in meshing engagement with a large gear wheel 32 provided on the storage drum 7. The ribbon 6 is secured to the drum by bolts 33 and is arranged to wind onto and unwind from the drum during respective reverse and forward movement of the buffer 9 mounted on the end of the ribbon. During the reverse stroke of the ribbon the ratchet clutch 8 is engaged to transmit drive from the electric motor via the reduction gear assembly to the gear wheel 32 of the drum 7, whereas during the forward stroke the ratchet clutch slips if there is any tendency for the drum to be driven faster than the capstan 5 is pulling the ribbon. This avoids the possibility of the portion of ribbon extending between the drum 7 and the driving capstan 5 being put under compression during the forward stroke.

The driving capstan 5 drives the ribbon during both forward and reverse strokes thereof. A gear wheel 38 is provided adjacent gear wheel 22 on the shaft 23 and is in meshing engagement with a forwardly and downwardly disposed larger gear wheel 39. This gear wheel is splined on the end of a capstan shaft 40 which is rotatably mounted at each end by bearings 41, 42 respectively supported by the main housing 10 and the side casing 11. The driving capstan 5 is fixedly mounted on the shaft 40 at a central portion thereof and has a rounded outer surface for driving engagement with the curved upper surface of the ribbon 6. At this point of engagement the ribbon cross-section is in its natural, unstressed, part-circular shape, whereas further back the ribbon is flattened onto the storage drum 7.

A pressure roller 43 is rotatably mounted beneath the driving capstan and has a concave outer surface for engagement with the convex lower surface of the ribbon. The pressure roller is rotatably supported by a yoke 44 which is pivotally mounted to the main housing 10 and the side casing 11 at a pivot axis 45. A compression spring 46 disposed towards the rear of the rammer assembly urges the yoke 44 to tilt about its pivot 45 so as to push the pressure roller 43 upwardly against the ribbon 6. In this manner the capstan 5 and the pressure roller 43 together provide guided driving of the ribbon 6 during both forward and reverse movement thereof.

Further guide means 47 are provided at the region where the ribbon emerges from the main housing 10.

Figure 2:
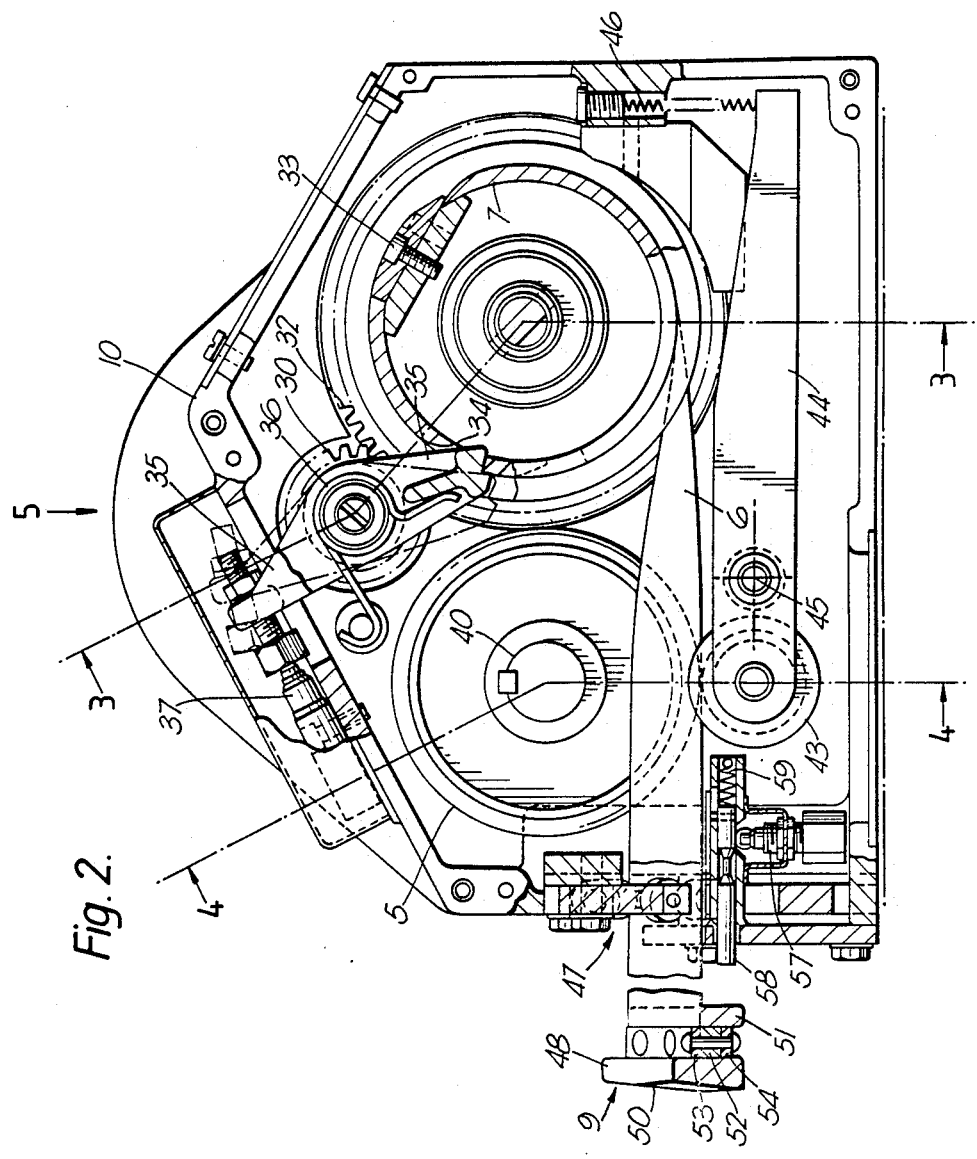
FIG. 2 shows the assembly partly in side elevation with a casing side plate removed, and partly in section through the centre-line of the assembly.

Suitable means are provided to detect the end of the forward stroke of the ribbon 6 and the buffer 9. Referring to FIG. 2, a slot 34 is formed in the outer surface of the storage drum 7 and a pivotally mounted pawl 35 is urged towards said outer surface by a spring 36. FIG. 2 shows the ribbon in its most forward position, at which time the pawl engages in the slot both to prevent further forward movement and to actuate a micro-switch 37 which signals that the end of the forward stoke has been reached. A signal is then transmitted to the motor 2 to change the direction of rotation thereof.

A micro-switch 57 is also provided to detect the end of the reverse stroke of the ribbon 6 and the buffer 9. At this moment a rear flange 51 of the buffer pushes a push rod 58 against a compression spring 59, thereby actuating the micro-switch to signal that the end of the reverse stroke has been reached. A signal is then transmitted to the motor 2 to change the direction of rotation thereof.

Figure 7:
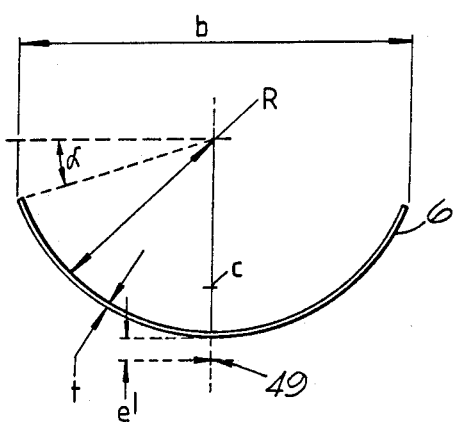
FIG. 7 shows a preferred ribbon section.

Referring to FIGS. 2, 5 and 6 the buffer 9 at the end of the ribbon 6 includes a rubber engagement pad 48 which makes contact with the load to be pushed during the forward stroke. The engagement pad generally follows the curvature of the ribbon across the breadth thereof and is wedge-shaped as viewed in section through the centre-line of the assembly (FIG. 2). The precise shape of the front face of the engagement pad is selected to ensure that the net longitudinal force on the ribbon during its forward stroke is downwardly offset from the longitudinal axis through the centroid of the ribbon cross-section. FIG. 7 shows the point of net loading 49 which is offset from the centroid C, the dimension of offset being measured in terms of the distance $e'$ from the convex face of the ribbon in a direction away from the centre of curvature. Such eccentric loading ensures that lateral deflection of the ribbon acting as a strut under compression will occur in the upward direction.

The one piece rubber engagement pad 48 has a front flange 50 and a rear flange 51 joined by a pair of integral spaced apart webs 52. The upper surfaces of the webs 52 and the flange 51 engage the lower surface of the ribbon end portion which is reinforced by an upper steel backing strip 53 and a lower steel backing strip (not shown) soldered into positions and further retained. The rubber engagement pad is held in position on the reinforced ribbon end by a clamp plate 54 shaped to fit the webs 52 and contour of the lower reinforcing strip and retained in position by rivets 56 thereby gripping the webs 50 to retain the engagement pad 48 in position.

The design procedure for selection of a suitable ribbon cross-section will be described with reference to FIGS. 7 to 10. FIG. 7 illustrates one preferred ribbon section which is part-circular in shape and which can be defined in terms of the illustrated parameters, as follows:

R = radius of ribbon section
t = thickness of ribbon section
b = breadth of ribbon section
$\alpha$ = angle $\alpha$, where $2\alpha$ is the difference between between 180° and the angle subtended by the ribbon section at its centre of curvature FIG. 8 illustrates the portion of the ribbon under longitudinal compression, extending between the buffer at one end 60 and the guide means 47 at the other end 61. The analysis which forms the basis of the design procedure treats this ribbon portion as a strut pinned at its end 60 and encastre at its end 61. In FIG. 8:

l = length oof strut portion of ribbon
w = length of strut portion of ribbon
P = maximum lateral deflection of ribbon
$e'$ = longitudinal load on ribbon to point of load application In order to select a suitable ribbon cross-section to carry the compressive load during transfer of the mass while deflecting laterally by no more than a permitted amount, the load-deflection characteristic of a number of sections under eccentric loading is established. This takes into account the fact that any lateral deflection of the ribbon results in a change of cross sectional shape which reduces flexural rigidity, and therefore to establish the load-deflection characteristic for any given section a step by step method is used. Initially, a small value of lateral deflection w is specified (for example when l = 2259 mm a suitable initial value of w is 0.25 mm). Using this value and the value of flexural rigidity (EI) of the section in its undeflected state, the force P required to produce such a deflection is calculated. At this loading and deflection, the ribbon section shape will have changed and a new value of flexural rigidity (EI) for the new shape is calculated. For this purpose it is assumed that curvature of the ribbon section is reduced but that it remains circular in form. The new value of EI and the initial value of P are used to calculate an increment of deflection, which is then added to the originally specified deflection to give a new value of lateral deflection w. This process is then repeated, using the new w to calculate a new P, updating EI etc. Eventually this step by step method extablishes a load-deflection characteristic for a given section loaded at a given offset from the centroid. Such characteristics can be extablished for different sections each loaded at various values of offset.

Figure 9:
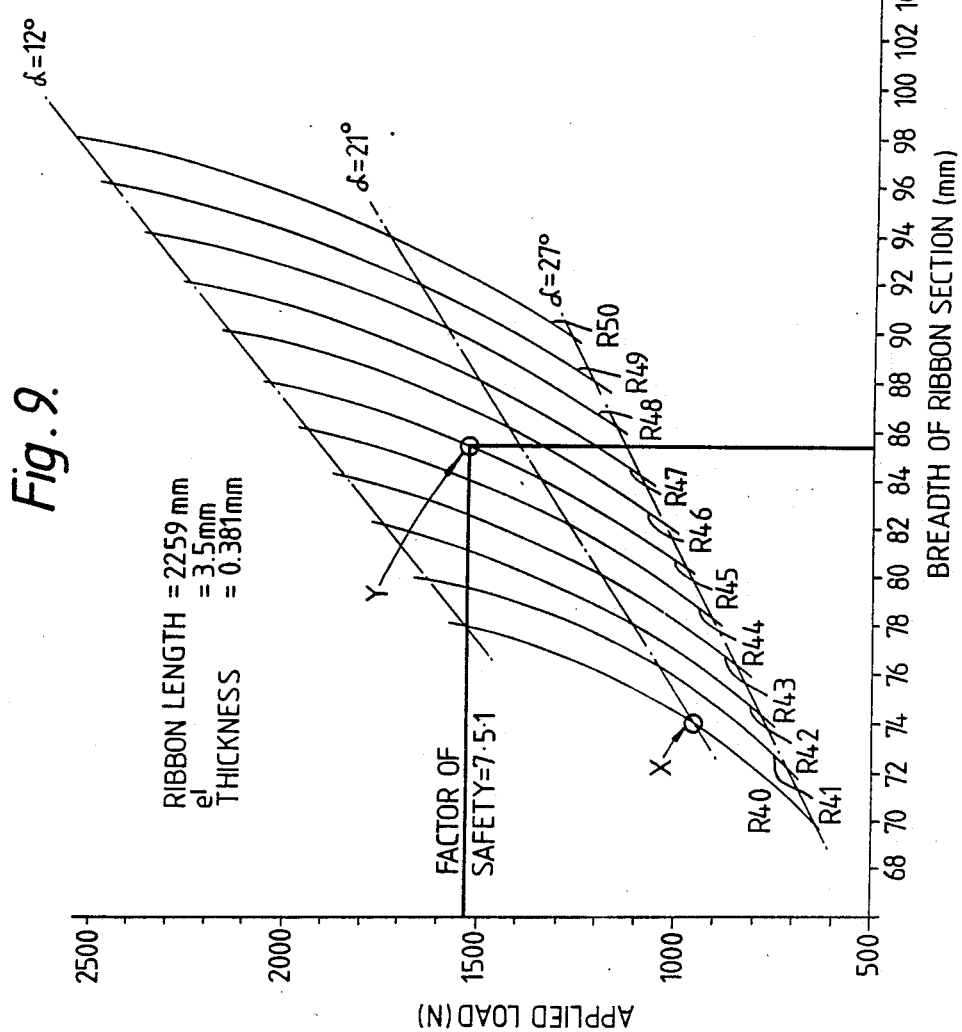
FIG. 9 is a graph showing a number of performance curves for various ribbon sections.

FIG. 9 shows performance curves for spring steel ribbon sections of various radii R = 40 mm (R40), R = 41 mm (R41) etc. up to R = 50 mm (R50), each over a range of values of ribbon section breadth b. In all cases, the length l of the strut portion of the ribbon is 2259 mm, the ribbon thickness t is 0.381 mm, the value of $e'$ is 3.5 mm and the permitted lateral deflection w is 15 mm. The performance curves have been constructed by using the step by step method described above in each case to establish the load P producing a lateral deflection of 15 mm. For example, a ribbon section of R = 40 mm and breadth 74 mm has a load-deflection characteristic in which a load of 950N produces 15 mm lateral deflection, as shown by point X on the graph.

Selection of a suitable ribbon section can be made using FIG. 9 as follows. If the maximum load to be exerted on the ribbon during transfer of the mass is for example calculated as 204N, applying a factor of safety of 7.5 gives a design load of 204 × 7.5 = 1530N. The horizontal line in FIG. 9 shows the various sections which are available to meet this design load. If it is desired for example to use R45 section then the graph shows at point Y that the required ribbon breadth b is 85.4 mm, and in this manner the section is selected.

In the above design procedure the dimension of distance $e'$ from the convex face of the ribbon to the point of load application has been specified as 3.5. mm. In fact the amount of eccentric loading necessary to ensure the desired direction of deflection is a matter of some engineering judgement, but to assist curves may be constructed allowing the value of $e'$ to be selected for a given load and deflection condition. An example of such a curve for a deflection w=15 mm is given in FIG. 10, and it can be seen that a value of e'=3.5. mm gives a load of about 1440N which is approximately 90% of the theoretical load for the ribbon when loaded symmetrically about its neutral axis. Of course this theoretical load can never be obtained in practice since if the ribbon was subjected to such a concentric load it would deflect in the opposite direction, away from the centre of curvature, leading either to collapse or in any event to a deflection larger than 15 mm. It has been found that e'=3.5. mm is sufficient to ensure deflection in the desired direction, towards the centre of curvature.

A preferred ribbon is made from spring steel which is in a hardened and tempered condition. The ribbon should be stress relieved after forming at 340–360° C. for a minimum of four hours.

Modifications to the specific embodiments and to any broad aspects thereof referred to or suggested herein may be apparent to those skilled in the art and the disclosure hereof is intended to encompass any such modifications.

I claim:

1. Apparatus for pushing a load, comprising: a drum; an elongate ribbon of thin resilient material attached at one end to the drum and wound therearound in a flattened state; means for unwinding the ribbon from the drum and extending it in a longitudinal direction so that an other end of the ribbon pushes the load, the ribbon having a characteristic of bending transversely into a part tubular shape as it is unwound and extended, the ribbon in the part tubular shape having a convex side and a concave side; and, deflecting means which deflects the extended ribbon between the drum and said other end of the ribbon so that in the longitudinal direction the ribbon follows a longitudinal curve with the concave side of the ribbon on the outside of the longitudinal curve.

2. Apparatus as claimed in claim 1, wherein the deflecting means is disposed between said other end of the ribbon and the load.

3. Apparatus as claimed in claim 2, wherein the deflecting means is a pad attached to said other end of the ribbon.

4. Apparatus as claimed in claim 3 wherein the pad has a load engaging face that has an initial load engaging portion displaced away from the convex side of the ribbon, and that is angled from said initial load engaging portion, in the longitudinal direction away from the load.

5. Apparatus as claimed in claim 3 wherein the pad extends over a width of said other end of the ribbon.

6. Apparatus as claimed in claim 3 wherein the pad is formed of a compressible shock absorbing material.

7. Apparatus as claimed in claim 6 wherein the pad of compressible material has an integral web which extends in the longitudinal direction along the ribbon, and which integral web is clamped to the ribbon.

8. Apparatus as claimed in claim 7 wherein the ribbon is reinforced where the web of the pad is clamped to the ribbon.

9. Apparatus as claimed in claim 7, wherein the pad of compressible material further comprises a pair of longitudinally spaced flanges joined by said web, and which pad is clamped in the region of said web to the ribbon.

10. Apparatus as claimed in claim 9 wherein the pair of spaced flanges are joined by a pair of spaced said webs.

11. Apparatus as claimed in claim 9 wherein the said web is clamped to the ribbon by means of a contoured clamp plate.

* * * * *